June 14, 1955     A. P. SPRINGER     2,710,656
VALVE MECHANISM
Filed April 21, 1951
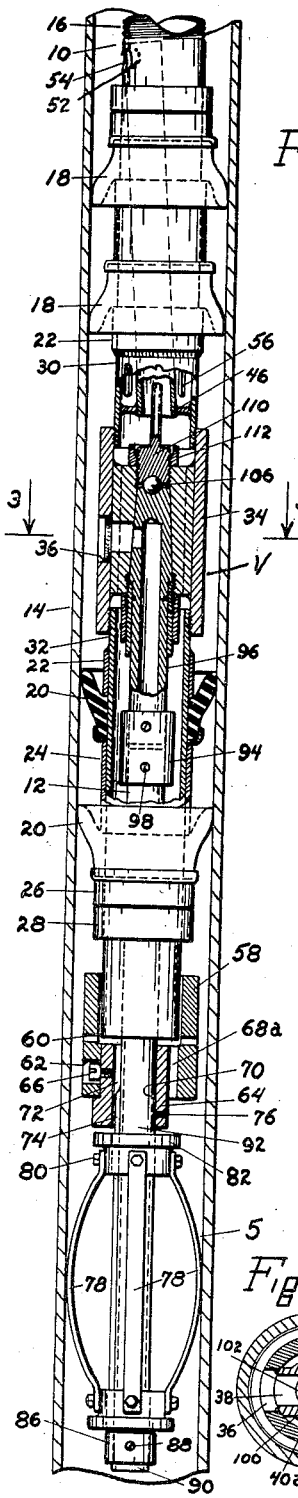
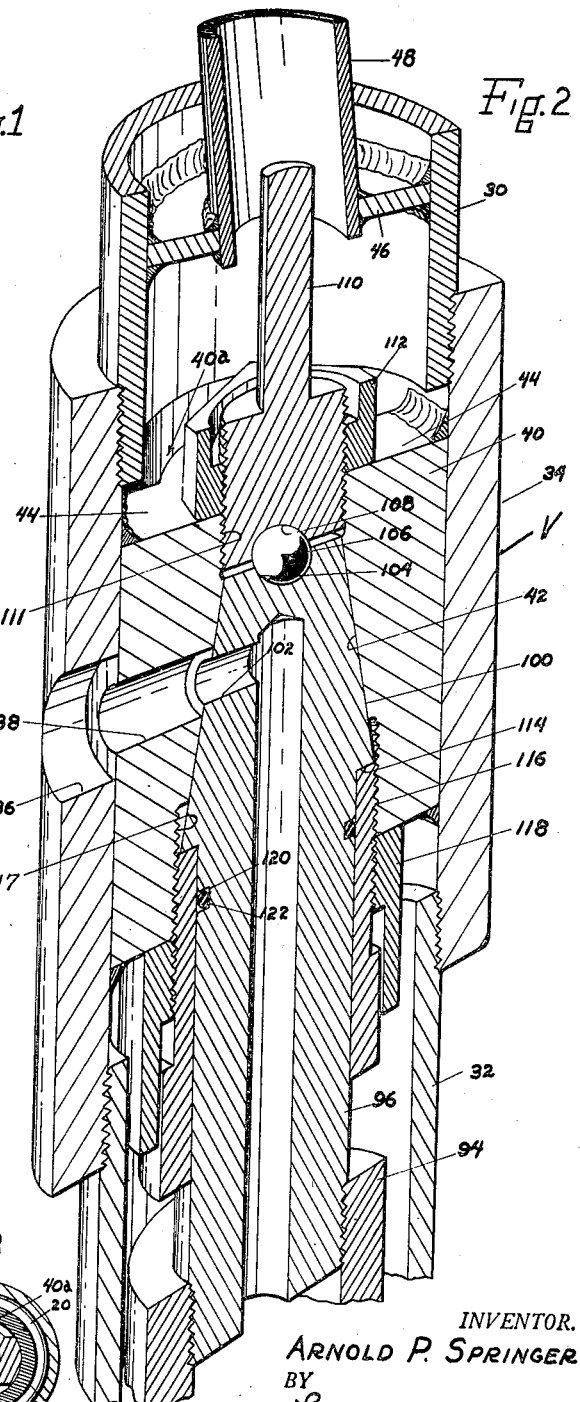
INVENTOR.
ARNOLD P. SPRINGER.
BY
Fulwider and Mattingly
ATTORNEYS

United States Patent Office 2,710,656
Patented June 14, 1955

2,710,656

VALVE MECHANISM

Arnold P. Springer, Long Beach, Calif.

Application April 21, 1951, Serial No. 222,245

5 Claims. (Cl. 166—146)

This invention relates to the field of fluid control mechanisms, and more particularly to a valve that may be positioned in a well tool or tubular member to regulate longitudinal and radial flow of fluid therethrough.

The present application is a continuation-in-part of application, Serial No. 714,973 filed in the United States Patent Office December 9, 1946 on a "Well Apparatus," and issued September 25, 1951 as Patent Number 2,569,026.

Although various types of valves have been devised in the past for use in oil well tools to control the flow of fluid therethrough, the majority of such valves have the disadvantages that they are not positive in operation, may completely fail to function at a critical time, and are not capable of withstanding the severe physical conditions to which they are subjected for any sustained length of time.

The primary purpose in devising the present invention is to provide a valve particularly adapted for use in well tools, tubing strings, and other tubular members that overcomes the disadvantages of the prior art fluid control devices.

A major object of the invention is to furnish a valve that controls the flow of fluid in both a longitudinal and radial direction after installation, may be opened and closed by rotation of the tool or tubular member, has an extremely simple mechanical structure, requires a minimum of maintenance attention, is positive in operation, and will not bind when the tool or tubular member in which it is installed is subjected to sudden shock or pressure.

Another object of the invention is to supply a valve that may be fabricated from standard commercially available materials, may be adjusted to compensate for wear on the moving parts thereof, and does not require elaborate plant facilities for its manufacture.

These and other objects and advantages of the invention will become apparent from the following description of a preferred form thereof, and from the drawing illustrating that form in which:

Figure 1 is a vertical cross-sectional view of a well tool in which the valve is installed;

Figure 2 is a perspective view of the valve with a portion thereof cut away; and Figure 3 is a horizontal cross-sectional view of the valve taken on the line 3—3 of Figure 1.

Referring now to the drawing for the general arrangement of the invention, it will be seen that the interior mechanical details of the valve, hereinafter referred to generally by the letter "V," is shown in Figure 2. Although the valve V may be used in various forms of well tools, tubing string and other tubular members, the valve is shown in the drawing installed in the well apparatus disclosed and claimed in pending application, Serial No. 714,973.

The oil tool apparatus shown in Figure 1 includes a tubular body 10 from which a tubular member 12 of considerably smaller diameter extends downwardly. Tubular member 12 supports spring means S on the lower end thereof, which spring means slidably but nonrotatably engage the interior of casing 14 to permit the body 10 to be rotated relative to the tubular member for reasons that will hereinafter become apparent. When vertically positioned the tubular body 10 has an upper threaded end 16 for attachment to a pipe string, and is provided with an upper pair of packers 18 and a lower pair of packers 20. The proximate packers of the pairs are located axially of the tubular body by collars 22 which may be welded in position with respect to the tubular body 10, the two packers constituting a pair separated from one another by spacing sleeves 24. The remote packers of the two pairs are adjusted with respect to their spacing sleeves 24 by means of retainer nuts 26 threaded on the tubular body 10. The retainer nuts are held against accidental movement by means of packing nuts 28 likewise threaded upon the tubular body 10.

The tubular body 10 comprises an upper and lower section 30 and 32 respectively. Sections 30 and 32 are threaded on their inner ends and engage the tapped open ends of a valve body 34. The valve body 34 is preferably formed from heavy tubular stock, and has a radial port 36 extending through one of the side walls thereof. Although the valve body 34 is shown in Figure 1 as connecting the two sections 30 and 32, it will be apparent that the valve body may be interposed between two lengths of pipe string or other tubular members should it be desired. The port 36 is at all times in registry with a radial port 38 formed in a spider 40. The spider 40 is of such size that it may be slidably inserted in the valve body 34, and affixed to the interior surface thereof by welding or other conventional means. Spider 40 has a longitudinally extending frusto-conical valve seat 42 formed therein that is in communication with port 36.

The spider 40 has a number of relatively short arms 44 that extend outwardly therefrom and are welded or otherwise secured to the interior surface of valve body 34. Arms 44 cooperate with the interior surface of valve body 34 to provide a plurality of longitudinally extending passages 40a, with said passages constituting a portion of a constantly open bypass between body sections 30 and 32.

An annular partition 46 is positioned in the lower portion of section 30 that engages valve body 34, with the partition having a tubular member 48 extending upwardly at an angle from an opening formed therein. The tubular member 48 terminates at its upper end in a cap or other closure means, and a port 52 is formed in the member adjacent to the closure means. Port 52 is at all times in registry with a port 54 extending through the side wall of body section 30 above the uppermost packer 18. A plurality of radial ports 56 are formed in the body section 30 below the lowermost packer 18 mounted thereon. The ports 56 permit fluid to flow between the body section 30 and the confined space defined by the pair of innermost packers 18 and 20 and the casing 14.

The free end of body section 32 is threaded and engages a tapped sleeve 58 in which a plurality of radial ports 60 are formed. An arcuate slot 62 is formed in sleeve 58, and is engaged by a filister headed screw 66 to control the degree of a shouldered plug 64. The reduced portion of plug 64 is situated within the confines of sleeve 58 has a polygonal periphery, with the prominencies thereof serving to center the plug within the sleeve, and from vertically extending passages 68 therein through which fluid may flow upwardly into body section 32. An enlarged portion of the plug 64 extends beyond the sleeve 58 which has a periphery similar to that of its reduced portion, the shoulder between the enlarged and reduced portions limiting the position of the plug axially with respect to the sleeve. The plug is provided with an internal bore 70 to receive the lower end of the tubular member 12, said plug having diametrically disposed keyways 72, one of which loosely receives a key 74 secured to the lower end of the tubular member as by welding.

The shouldered plug 64 is further secured to the tubular member 12 to prevent relative axial movement by means of one or more set screws 76. On the end of the tubular member 12, extending below the shouldered plug 64, are mounted the springs S. The springs S include a plurality of bowed drag springs 78, the ends of which are secured by screws 80 to shouldered drag spring collars 82, one or both of which may move axially with respect to the tubular members, but which are retained non-rotatable with respect thereto by means of one or more keyways receiving the key 74. This drag string assembly is retained on the tubular member 12 by a collar 86 mounted on the lower end of the tubular member and affixed thereto by a suitable number of set screws 88. The lowermost end of tubular member 12 is open to define an axial port 90.

The tubular member 12 is comprised of upper and lower tubular sections 96 and 92 respectively, with the adjoining ends of said sections 92 and 96 threaded to engage a coupling sleeve 94. Sleeve 94 is provided with set screws 98 to maintain tubular sections 92 and 96 in the desired relationship to one another.

The upper end of tubular section 96 terminates in a valve plug 100 having a radial port 102 for selective registry with radial ports 36 and 38 of the spider 40 and valve body 34 respectively. The radial surface of the plug has an arcuate depression 104 formed therein that serves as a seat for a ball thrust bearing 106. Another seat 108 similar in configuration to 104 is provided for ball bearing 106 in the lower radial end of a threaded adjusting screw 110. Adjusting screw 110 is threadedly received in a tapped bore 111 centrally formed in the upper end of spider 40 in which it is secured in locked position by means of a castellated locking nut 112, as may best be seen in Figure 2.

The lower end of the plug 100 is defined by a shoulder 114 which bears on an adjusting sleeve 116. The upper end of sleeve 116 is threaded into a tapped bore 117 centrally formed in the lower end of the spider. Externally threaded on adjusting sleeve 116 is a locking sleeve 118, the upper end of which bears upon the lower radial surface of spider 40 when the parts have been properly adjusted to secure correct operation of the valve with regard to fluid tightness and proper clearance. The tubular section 96 has an annular groove 120 formed therein below the valve plug 100 to receive a packing 122 which may be of the O-ring type.

The drag springs S frictionally engage the inner wall of casing 14 in a non-rotatable manner, and it is only necessary to rotate the pipe string supporting the tubular body 10 through a suitable angle to close the valve V.

When a sand bridge is encountered at the time the well apparatus is lowered into a bore hole (Figure 1), such an obstruction may be "washed out" by placing the valve V in the open position. Fluid is then pumped downwardly through the pipe string supporting the tubular body 10, flowing radially through ports 56 into the chamber defined between the packers and the well casing, re-entering the tubular body through the radial ports 36, 38 and 102, flowing down the tubular member 12 against the bridge through the axial port 90, passing upwardly with the deposit externally of the tubular member and entering the tubular body between the shoulder drag spring collar 82 and the shoulder plug 64. This fluid, as well as fluid entering through the radial port 60, flows upwardly around the spider 40 through the passages 40a into the tubular conduit 48, and radially therefrom through the ports 52 and 54 for expulsion above the packers. Should it be desired to carry out a back scuttling operation, fluid is introduced through the radial port 54 producing a reversal of the flow just described, delivery then being through the upper axial end of the tubular body 10.

When a cementing, testing, or comparable operation is performed, the pipe string is rotated sufficiently to close valve V, whereupon fluid introduced through the upper end of tubular body 10 will flow radially from the port 56 into the chamber defined by the packers and the well casing 14. Thus it will be seen that valve V, whether installed in the form of well apparatus shown in Figure 1, or in a tubular member having longitudinally and radially extending passages, permits the flow of fluid to be controlled by rotation of the valve-supporting member 10. The rotation of the valve-supporting member is controlled from the ground surface, with the distinct advantage that the member can be rotated even though the device in which the valve is installed is temporarily sanded in the well bore.

The well apparatus shown in Figure 1 has longitudinally extending by-pass passages, of which the passages 40a form a part. In the event such a by-pass passage is not required, the passages 40a in spider 40 are simply eliminated, with the spider then serving as a partition to divide the upper and lower portions of the well apparatus or tubular member in which the valve V is installed.

The spider 40 is shown in the drawings as positioned within the confines of the valve body 34 which is detachably connected to the sections 30 and 32. However, should it be desired the spider 40 could be positioned within the confines of a tubular member or tool that has a radial port formed therein which is in registry with the radial port in said spider. In such a construction the valve body 34 is replaced by the body of the tubular member or tool. It will be apparent that such an alteration in valve structure in no sense changes the operation of the valve V previously described in detail.

Although the valve assembly herein shown and described is fully capable of achieving the objects and providing the advantages hereinbefore mentioned, it is to be understood that it is merely illustrative of the presently preferred embodiment of the invention and that it is not limited to the details of construction herein shown and described other than as defined by the appended claims.

I claim:

1. A valve mechanism to control the flow of fluid in a tubular member having upper and lower sections which are relatively rotatable, said tubular member being adapted to be lowered into a well bore, which includes: a valve body in the form of a cylindrical shell that joins the upper and lower sections of said tubular member; a spider mounted within the interior of said valve body, with said spider having a radial port formed therein that is in communication with a radial port formed in said valve body, and said spider having a longitudinally extending valve seat formed therein and threaded bores forming longitudinal continuations of each end of said valve seat; a plug rotatably mounted in said valve seat, said plug being formed with a radial port and longitudinally extending passage that are in communication with one another; an adjusting screw threaded into the bore forming the continuation of the upper end of said valve seat; a ball bearing positioned in recesses formed in the adjoining ends of said plug and screw; a lock nut engaging said screw and holding said screw in the desired vertical position in said spider for said ball to act as a thrust bearing when said plug is subjected to an upward force; a threaded adjusting sleeve that is screwed into the bore forming the continuation of the lower end of said valve seat, with said sleeve abutting a shoulder formed on said plug so as to movably hold said plug in said valve seat and permit said plug to be longitudinally adjusted relative to said spider; a tube depending downwardly from said plug and in communication with said passage formed therein; and friction means mounted on said tube that engage the interior surface of well casing when said tubular member is lowered into a bore hole to permit said tubular member to be rotated relative to said plug whereby said ports in said valve body and spider are brought into and out of registry with said port in said plug to control the flow of fluid between said ports in said valve body and spider and said port in said plug.

2. A valve mechanism to control the flow of fluid in a tubular well apparatus adapted to be lowered into a well bore said well apparatus having upper and lower sections which are relatively rotatable, which includes: a tubular valve body joining the upper and lower sections of said well apparatus; a spider mounted within the interior of said valve body, said spider having a radial port formed therein in communication with a radial port formed in said valve body, and said spider having a bore extending therethrough tapped at both ends and intermediately tapered to form a valve seat; an adjusting screw threaded into the upper end of said bore; a plug being rotatably mounted in said valve seat with the upper portion of said plug tapered and forming a shoulder with the lower portion thereof, and said plug having a radial bore and a longitudinally extending passage formed therein that are in communication with one another; an adjusting-screw threaded into the upper end of said spider bore; a ball bearing positioned in recesses formed in the adjoining ends of said plug and screw; a threaded adjusting sleeve screwed into the lower tapped portion of said spider bore, with the upper end of said sleeve movably engaging said shoulder whereby said plug may be longitudinally adjusted relative to said valve seat by rotation of said adjusting screw and sleeve; a tubular member extending downwardly from said plug and in communication with said passage; and friction means mounted on said tubular member that non-rotatably engage the inner surface of said well bore when said apparatus is lowered thereinto whereby said valve body can be rotated relative to said plug to bring said ports formed in said valve body and spider into and out of alignment with said port formed in said plug so as to control the flow of fluid between said ports and tubular member.

3. A valve mechanism for controlling the flow of fluid in a well apparatus adapted to be positioned in a well bore, said well apparatus having upper and lower sections which are relatively rotatable, which includes: a tubular valve body joining the upper and lower sections of said well apparatus; a spider mounted within the interior of said valve body, said spider having a radial port formed therein communicating with a radial port formed in said valve body, and said spider also being formed with a longitudinally extending valve seat having an upwardly disposed tapped bore extending from one end thereof and a downwardly disposed tapped bore in communication with the lower end of said valve seat; a plug rotatably mounted in said valve seat, said plug being formed with a radial port and a longitudinally extending passage that communicate with one another; a tubular member extending downwardly from said plug; an adjusting-screw threaded into said upwardly disposed tapped spider bore; a ball bearing positioned in recesses formed in the adjoining ends of said plug and screw; a lock nut engaging said screw and holding it in the desired vertical position on said spider whereby said ball acts as a thrust bearing when said plug is subjected to an upward force; a threaded adjusting sleeve screwed into said downwardly disposed tapped spider bore forming the continuation of the lower end of said valve seat, with said sleeve holding said plug in said valve seat and permitting longitudinal adjustment of said plug relative to said spider; and means connected to the tubular member that depends from said plug, said means being adapted to non-rotatably engage the interior surface of said well bore when said apparatus is lowered therein to permit rotation of said valve body relative to said plug whereby said ports in said valve body and spider are brought into and out of alignment with said port in said plug to control the flow of fluid between said ports in said valve body and spider and said passage in said plug.

4. A valve mechanism for controlling the flow of fluid in a well apparatus having relatively rotatable upper and lower tubular sections adapted to be positioned in a well bore which includes: a cylindrical valve body connecting said tubular sections together; a spider mounted within the interior of said valve body, said spider having a radial port formed therein communicating with a radial port formed in said valve body, said spider also being formed with a longitudinally extending valve seat that has upwardly and downwardly extending bores in communication with the ends thereof; a plug rotatably mounted in said valve seat, said plug having a radial port and a longitudinally extending passage that communicate with one another and a depending tubular portion; a vertically adjustable member extending downwardly into said upwardly extending spider bore; a bearing means positioned in the adjoining ends of said plug and adjustable member; means to lock said adjustable member in the desired position relative to said spider; a vertically adjustable sleeve having a portion thereof disposed in said downwardly extending spider bore, with said sleeve holding said plug in said valve seat to permit vertical adjustment of said plug relative to said spider; and friction means connected to said depending tubular portion of said plug, adapted to non-rotatably engage the interior surface of said well bore when said apparatus is lowered therein to permit rotation of said valve body and spider relative to said plug whereby said ports in said valve body and spider are brought into and out of alignment with said port in said plug to control the flow of fluid between said ports in said valve body and spider and said passage in said plug.

5. A valve mechanism for controlling the flow of fluid in a well apparatus having relatively rotatable upper and lower tubular sections and a tubular valve body therebetween adapted to be positioned in a well bore which includes; a spider mounted within the interior of said valve body, said spider having a radial port formed therein communicating with a radial port formed in said body, said spider also being formed with a longitudinally extending valve seat that has an upwardly extending bore in communication with said radial port; a plug rotatably mounted in said valve seat, said plug being formed with a radial port and a longitudinally extending passage that communicate with one another; a vertically adjustable member extending downwardly into said upwardly extending spider bore; a ball bearing positioned in recesses formed in the adjoining ends of said plug and adjustable member; means to lock said adjustable member in the desired position relative to said spider for said ball to act as a thrust bearing when said plug is subjected to an upward force; movable means bearing against the lower surface of said plug that hold said plug in said valve seat to permit vertical adjustment of said plug relative to said spider; tubular means depending from said plug and in communication with said passage therein; and spring means connected to said tubular means, said spring means being adapted to non-rotatably engage the interior surface of said well bore when said apparatus is lowered therein to permit rotation of said upper tubular member relative to said plug whereby said ports in said valve body and spider are brought into and out of alignment with said port in said plug to control the flow of fluid between said ports in said valve body and spider and said passage in said plug.

References Cited in the file of this patent

UNITED STATES PATENTS

| | | |
|---|---|---|
| 1,180,312 | Nordstrom | Apr. 25, 1916 |
| 1,747,908 | Seifert | Feb. 18, 1930 |
| 2,037,896 | Haines | Apr. 21, 1936 |
| 2,134,200 | Pivoto | Oct. 25, 1938 |
| 2,403,987 | Lewis | July 16, 1946 |
| 2,549,198 | Hayward | Apr. 17, 1951 |
| 2,569,026 | Springer | Sept. 25, 1951 |
| 2,569,732 | Ragan | Oct. 2, 1951 |